(12) United States Patent
Zhang et al.

(10) Patent No.: US 10,042,134 B2
(45) Date of Patent: Aug. 7, 2018

(54) OPTICAL MODULE

(71) Applicant: FUJITSU COMPONENT LIMITED, Tokyo (JP)

(72) Inventors: Hongfei Zhang, Tokyo (JP); Shigemi Kurashima, Tokyo (JP); Satoshi Moriyama, Tokyo (JP); Shinichiro Akieda, Tokyo (JP); Rie Gappa, Tokyo (JP); Mitsuki Kanda, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/834,462

(22) Filed: Dec. 7, 2017

(65) Prior Publication Data
US 2018/0095230 A1   Apr. 5, 2018

Related U.S. Application Data

(62) Division of application No. 15/165,053, filed on May 26, 2016, now Pat. No. 9,857,546.

(30) Foreign Application Priority Data

Jun. 2, 2015   (JP) ................. 2015-112611

(51) Int. Cl.
   *G02B 6/42*   (2006.01)
   *G02B 6/38*   (2006.01)
   *G02B 6/32*   (2006.01)

(52) U.S. Cl.
   CPC ............. *G02B 6/4292* (2013.01); *G02B 6/32* (2013.01); *G02B 6/3882* (2013.01); *G02B 6/4206* (2013.01); *G02B 6/4214* (2013.01)

(58) Field of Classification Search
   None
   See application file for complete search history.

(56) References Cited

U.S. PATENT DOCUMENTS

| 6,934,450 | B2 | 8/2005 | Hiramatsu |
| 6,944,377 | B2 | 9/2005 | Umebayshi et al. |
| 7,715,666 | B2 | 5/2010 | Kodama et al. |
| 2003/0152336 | A1 | 8/2003 | Gurevich et al. |

(Continued)

FOREIGN PATENT DOCUMENTS

| JP | 2006-309113 | 11/2006 |
| JP | 2009-020426 | 1/2009 |

OTHER PUBLICATIONS

Office Action dated Jan. 25, 2018 issued with respect to the related U.S. Appl. No. 15/834,504.

(Continued)

*Primary Examiner* — Chad H Smith
(74) *Attorney, Agent, or Firm* — IPUSA, PLLC

(57) ABSTRACT

An optical module for connecting photoelectric conversion device on a substrate to a ferrule connected to an optical fiber includes a body configured to be mounted on the substrate, a first lens disposed on the body at a side thereof connectable to the ferrule, a second lens disposed on the body at a side thereof facing the substrate, and a core disposed in the body between the first lens and the second lens, wherein a refractive index of the core is higher than a refractive index of the body.

3 Claims, 16 Drawing Sheets

(56) References Cited

U.S. PATENT DOCUMENTS

| | | |
|---|---|---|
| 2005/0058399 A1* | 3/2005 | Nishizawa ........... G02B 6/4214 385/39 |
| 2005/0058400 A1 | 3/2005 | Fukuoka |
| 2012/0033914 A1 | 2/2012 | Rosenberg et al. |

OTHER PUBLICATIONS

Office Action dated May 30, 2018 issued with respect to the related U.S. Appl. No. 15/834,504.

* cited by examiner

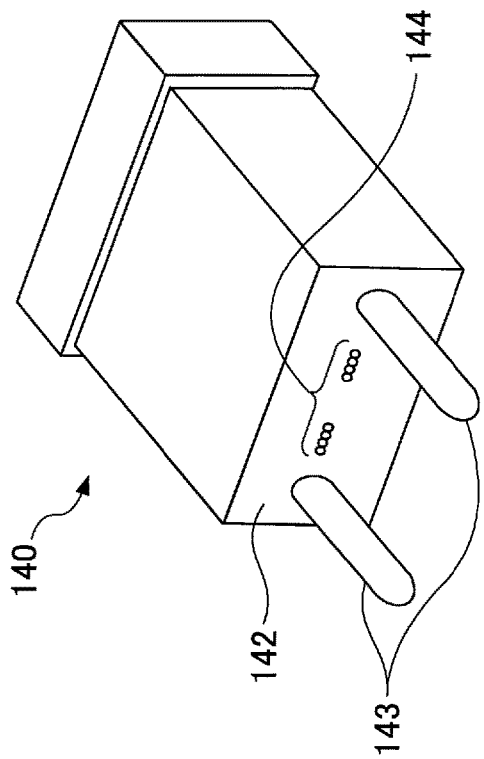
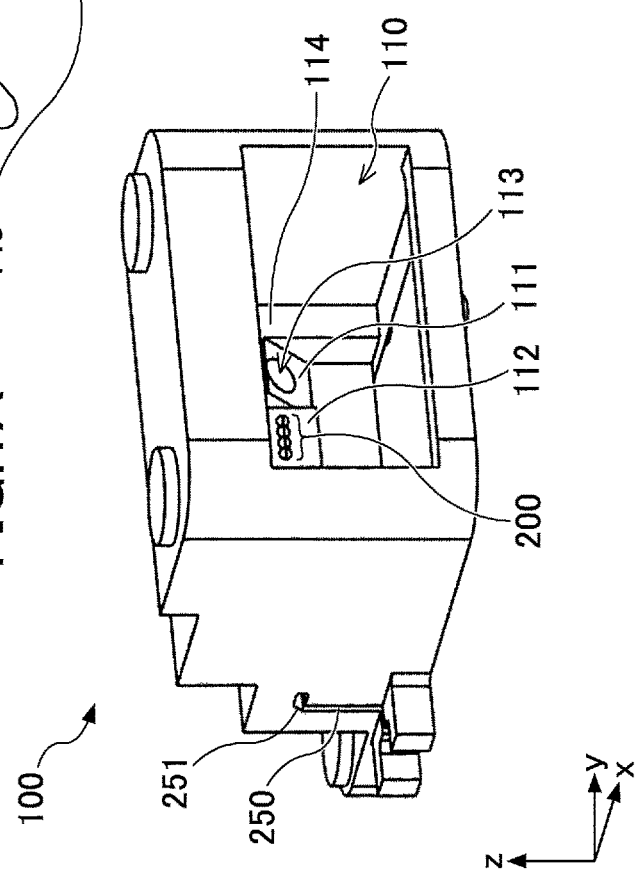

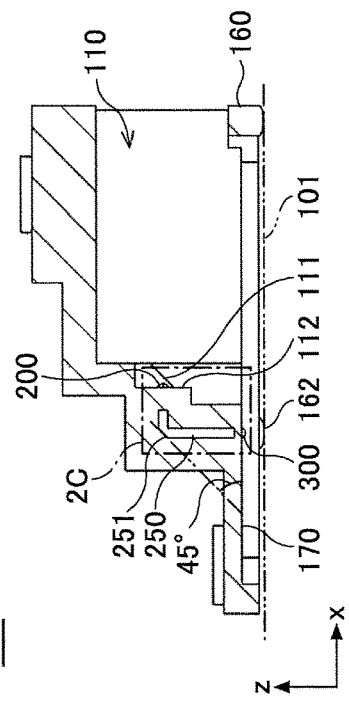
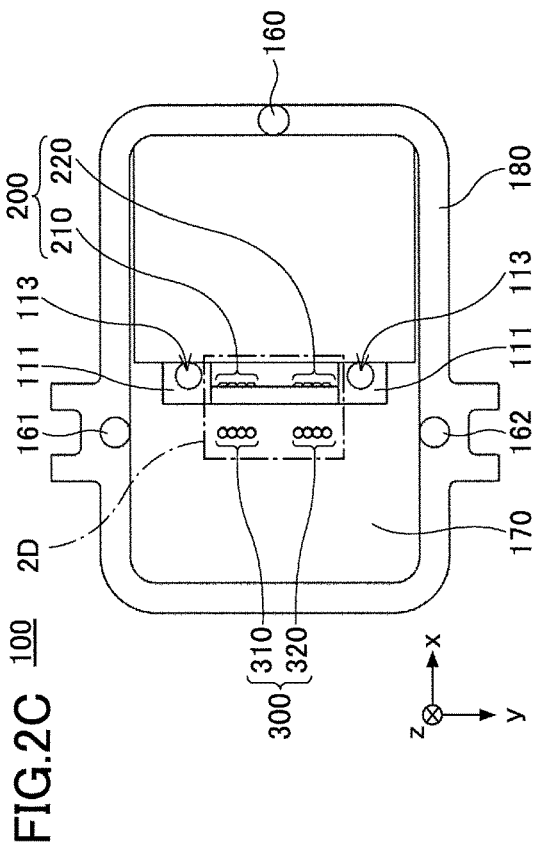
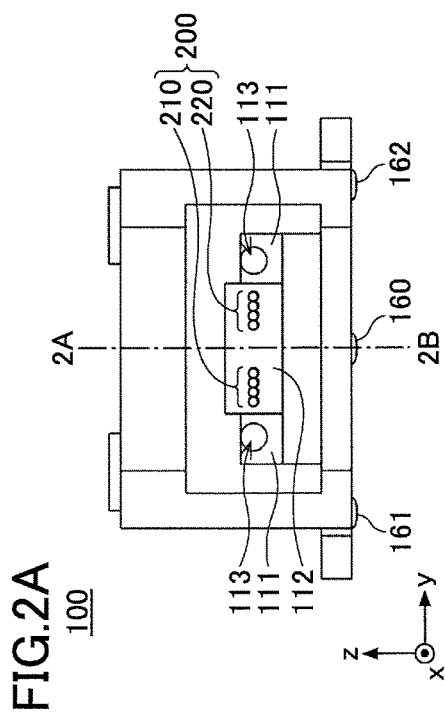

OPTICAL MODULE

CROSS-REFERENCE TO RELATED APPLICATIONS

This application is a divisional of and claims the benefit of U.S. application Ser. No. 15/165,053 filed on May 26, 2016, the entire contents of which are hereby incorporated by reference.

BACKGROUND OF THE INVENTION

1. Field of the Invention

The disclosures herein relate to an optical module.

2. Description of the Related Art

Advancement in the technology of high-speed, high-volume communication networks and communication control equipment has prompted the wide-spread use of optical fibers for communication and transmission purposes. Generally, an optical transceiver for conversion between an electrical signal and an optical signal is used at the connection point between an optical fiber and a device. Such an optical transceiver has an optical module providing an optical waveguide between an optical fiber and a photoelectric conversion device.

Conventional optical modules are comprised of a large number of components, which requires a large number of production steps at the time of assembly. The technology disclosed in Patent Document 1 or 2, for example, requires steps of filling a groove for forming an optical waveguide with core material for forming an optical fiber core, applying an over-clad film on the groove which is filled with the core material, and curing with respect to the over-clad film.

Further, an optical module having a plurality of lenses may be mounted on a printed circuit board ("board") on which photoelectric conversion devices are disposed. In such a case, misalignment of the optical module with respect to the set of photoelectric conversion devices ends up causing undesirable light loss. Similarly, displacement of lenses in the optical module from their intended positions also ends up causing the loss of light signals.

[Patent Document 1] Japanese Laid-open Patent Publication No. 2009-20426

[Patent Document 2] Japanese Laid-open Patent Publication No. 2006-309113

SUMMARY OF THE INVENTION

According to an embodiment, an optical module for connecting a photoelectric conversion device on a substrate to a ferrule connected to an optical fiber includes a body configured to be mounted on the substrate, a first lens disposed on the body at a side thereof connectable to the ferrule, a second lens disposed on the body at a side thereof facing the substrate, and a core disposed in the body between the first lens and the second lens, wherein a refractive index of the core is higher than a refractive index of the body.

According to an embodiment, an optical module for connecting a photoelectric conversion device on a substrate to a ferrule connected to an optical fiber includes a body configured to be mounted on the substrate, a first lens disposed on the body at a side thereof connectable to the ferrule, a second lens disposed on the body at a side thereof facing the substrate, and a core disposed in the body between the first lens and the second lens, wherein the core has faces thereof on which a coating film is formed.

According to an embodiment, an optical module for connecting a photoelectric conversion device on a substrate to a ferrule connected to an optical fiber includes a body configured to be mounted on the substrate, a first lens disposed on the body at a side thereof connectable to the ferrule, a second lens disposed on the body at a side thereof facing the substrate, and a space formed in the body between the first lens and the second lens.

According to at least one embodiment, the disclosed optical module enables the reduction of light loss even when the positions of disposed lenses or the like are displaced relative to photoelectric conversion devices.

BRIEF DESCRIPTION OF THE DRAWINGS

Other objects and further features of the present invention will be apparent from the following detailed description when read in conjunction with the accompanying drawings, in which:

FIGS. 1A and 1B are illustrative drawings of an optical module of a first embodiment;

FIGS. 2A through 2C are drawings illustrating the optical module of the first embodiment;

DESCRIPTION OF THE PREFERRED EMBODIMENTS

Figure 3A:
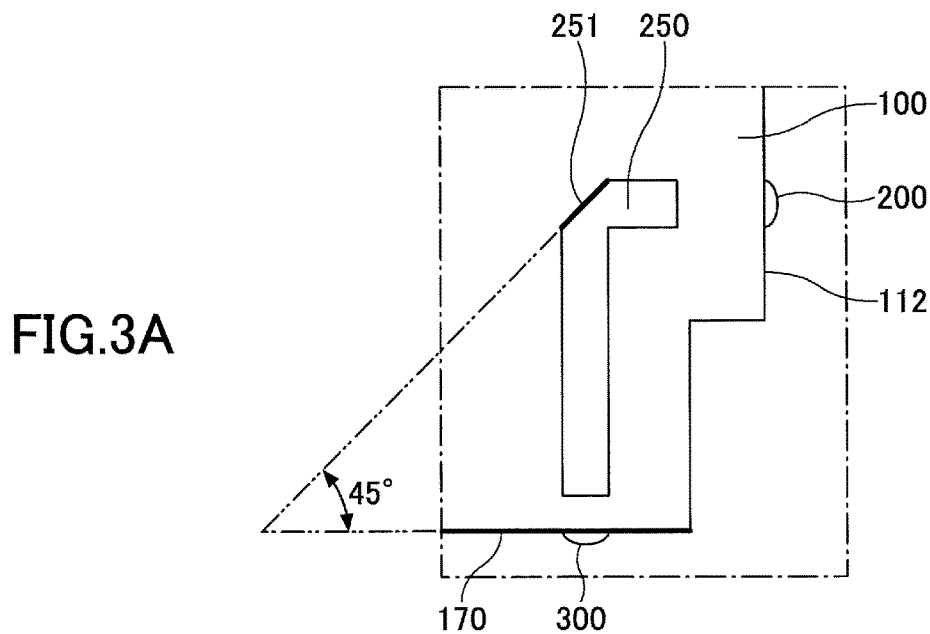
FIGS. 3A and 3B are drawings illustrating the optical module of the first embodiment.

Embodiments will be described by referring to the accompanying drawings. The same or similar elements are referred to by the same or similar numerals.

First Embodiment

An optical module according to an embodiment will be described. In the drawings, the longitudinal direction of an optical module is referred to as an x axis, and the lateral direction of the optical module is referred to as a y axis, with the vertical direction of the optical module being referred to as a z axis.

FIGS. 1A and 1B are perspective views of an optical module 100 and an MT (mechanical transfer) ferule 140 according to the present embodiment, respectively. The optical module 100 is made of transparent resin. As illustrated in FIG. 1A, the optical module 100 has an insertion hole 110 formed therein into which the MT ferule 140 is inserted. By inserting the MT ferule 140 having an optical fiber connected thereto into the insertion hole 110, the MT ferule 140 and the optical module 100 are connected to each other. Two sloped faces 111 (only one of which is visible in FIG. 1A), an end face 112, and a contact face 114 are formed on the inner surface of the insertion hole 110. When the MT ferule 140 is inserted into the insertion hole 110, a front face 142 of the MT ferule 140 comes in contact with the contact face 114.

The front face 142 has two pins 143 formed thereon. Each of the two sloped faces 111 has two holes 113 formed therein, respectively, which engage with the pins 143. The positions, size, and number of holes 113 are in agreement with the positions, size, and number of the pins 143. In the present embodiment, the pins 143 are cylindrical. Two circular holes, which coincide with the shape of the pins 143, are provided as the holes 113.

The end face 112 is situated between the two sloped faces 111. The end face 112 has a first lens group 200 formed thereon, which includes reception-purpose lenses and transmission-purpose lenses as will be described later.

The front face 142 has an opening group 144 formed thereon that includes a plurality of openings through which light signals are received or transmitted. The tip of each optical fiber connected to the MT ferule 140 is situated at the mouth of the corresponding opening. The openings are situated at positions that face the lenses of the first lens group 200. Optical signals propagating through the optical fibers pass through the openings to enter the lenses of the optical module 100. Optical signals transmitted from the lenses of the optical module 100 pass through the openings to enter the optical fibers.

In the following, a description will be given of the structure of the optical module 100 by referring to FIGS. 2A through 2C. FIG. 2A is a drawing illustrating the rear face of the optical module 100 where the insertion hole 110 is situated. FIG. 2B is a cross-sectional view of the optical module 100 taken along the line 2A-2A shown in FIG. 2A. FIG. 2C is a view of the bottom face of the optical module 100.

As illustrated in FIGS. 2A through 2C, the first lens group 200 includes four reception-purpose lenses 210 and four transmission-purpose lenses 220, which are lined up in the y-axis direction. The optical module 100 illustrated in FIGS. 2A through 2C enables the transmission and reception of optical signals for four channels.

The lenses 210, which are aspherical lenses, convert optical signals received from the optical fibers of the MT ferule 140 into parallel light. This causes the optical signal having propagated through the optical fibers to enter the optical module 100 as parallel light. The lenses 220, which are aspherical lenses, converge optical signals having propagated inside the optical module 100 for provision into the optical fibers. The use of aspherical lenses provides an advantage in that the loss of optical signal is reduced.

The holes 113 which extend in the x-axis direction are formed in the sloped faces 111, respectively, which are situated near the opposite ends of the first lens group 200. Namely, the holes 113 are formed near the opposite lateral ends of the end face 112, respectively, to extend perpendicularly to the end face 112 and in parallel to a plane 101. The plane 101 is an imaginary plane parallel to a bottom face 170 of the optical module 100. By engaging the pins 143 with the holes 113, the MT ferule 140 inserted into the insertion hole 110 is aligned with the optical module 100. With the MT ferule 140 inserted into the optical module 100, a gap is created between the first lens group 200 and the front face 142, in other words, the first lens group 200 does not come in direct contact with the front face 142.

The bottom face 170 has a second lens group 300 formed thereon. The bottom face 170 has a perimeter 180 on which legs 160 through 162 are formed. The legs 160 through 162 come in contact with a board when the optical module 100 is mounted to the board.

The second lens group 300 includes four transmission-purpose lenses 310 and four reception-purpose lenses 320, which are lined up in the y-axis direction. In the present embodiment, the four lenses 310 and the four lenses 320 are aspherical lenses. The lenses 310 converge optical signals having propagated inside the optical module 100 for transmission purposes. The optical signals transmitted from the lenses 310 enter an optical detector (not shown) mounted on the board.

The lenses 320, which receive optical signals emitted from light emission devices such as VCSELs (vertical cavity surface emitting lasers) mounted on the board, convert the received signals into parallel light that is input into the optical module 100. The optical signals received by the lenses 320 propagate in the form of parallel light inside the optical module 100.

Figure 3B:
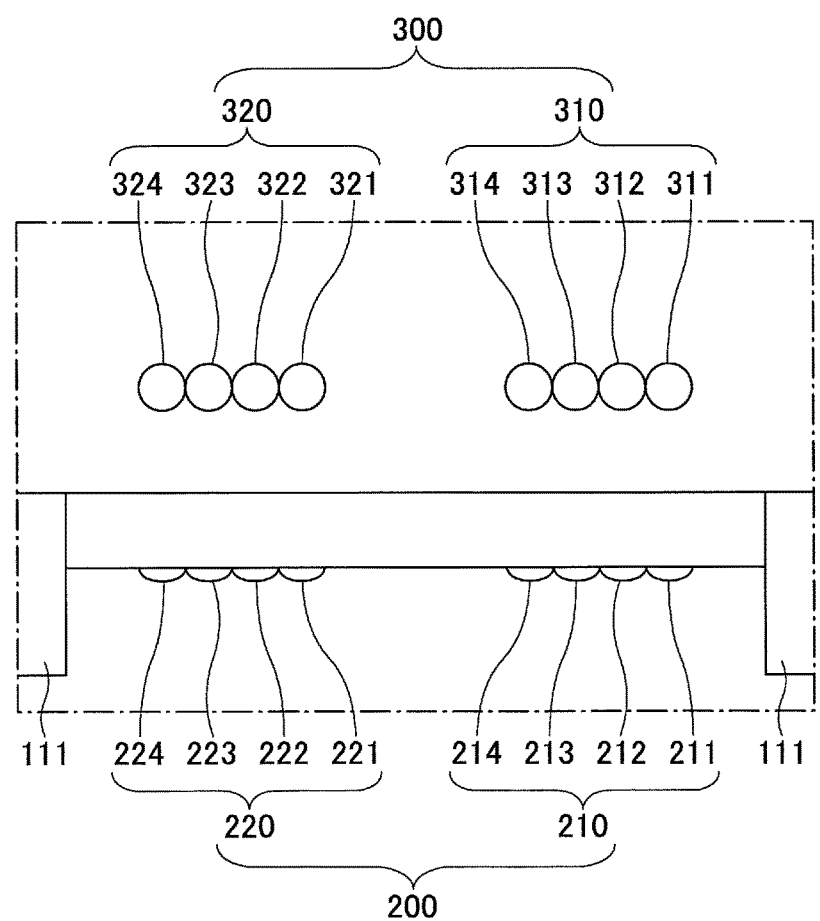

FIG. 3A is an enlarged view of the portion enclosed by the chain line 2C shown in FIG. 2B. FIG. 3B is an enlarged view of the portion enclosed by the chain line 2D shown in FIG. 2C. The optical module 100 has a core 250 for providing an optical coupling between the first lens group 200 and the second lens group 300. As illustrated in FIG. 3A, a sloped face 251 is formed halfway through the core 250 to reflect light entering the core 250. The core 250 has a refractive index higher than the refractive index of the transparent resin of the optical module member that surrounds the core 250.

In the present embodiment as illustrated in FIG. 3B, lenses 211, 212, 213, and 214 of the first lens group 200 are in one-to-one correspondence with lenses 311, 312, 313, and 314 of the second lens group 300. Further, lenses 221, 222, 223, and 224 of the first lens group 200, are in one-to-one correspondence with lenses 321, 322, 323, and 324 of the second lens group 300. The core 250 connects between the two lenses that correspond to each other.

As is illustrated in FIG. 2A, the plane 101 is defined as a flat plane that includes the end faces of the legs 160 through 162, and is parallel to the surface of the board. In the present embodiment, the angle between the plane 101 and the sloped face 251 of the core 250 is 45 degrees. The plane 101 is perpendicular to the end face 112.

In the present embodiment, light emitted in the normal direction of the plane 101 from light emitting devices (not shown in FIGS. 2A through 2C), such as VCSELs, situated directly below the lenses 320 enter the core 250 through the lenses 320. Light propagates through the core 250 perpendicularly to the bottom face 170, i.e., perpendicularly to the plane 101, and is then reflected by the sloped face 251. With the sloped face 251 situated at a 45-degree angle to the plane 101, the light reflected by the sloped face 251 thereafter propagates parallel to the plane 101 inside the core 250, and is then transmitted from the lenses 220.

Light which is transmitted from the MT ferule 140 (not shown in FIGS. 2A through 2C) perpendicularly to the end face 112 enters the core 250 through the lenses 210, and light is reflected by the sloped face 251. Light reflected by the sloped face 251 propagates inside the core 250 perpendicularly to the bottom face 170, and is then transmitted from the lenses 310 to enter an optical detector.

In the following, a description will be given of an optical transceiver by referring to FIG. 4 and FIGS. 5A through 5C.

Figure 4:
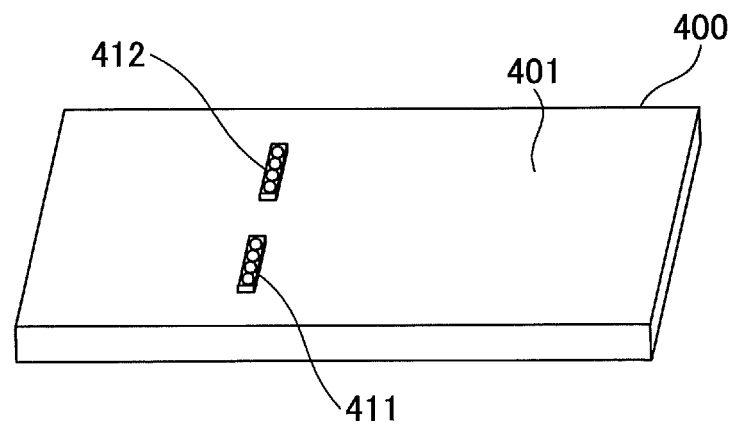
FIG. 4 is an illustrative drawing of the optical module of the first embodiment.

As illustrated in FIG. 4, a board 400 has optical detectors 411 and light emitting devices 412 mounted thereon. The light receiving faces of the optical detectors 411, which face the direction perpendicular to a plane 401 of the board 400, detect incoming optical signals. The light emitting devices 412 such as VCSELs transmit optical signals in the direction perpendicular to the plane 401.

Figure 5A:
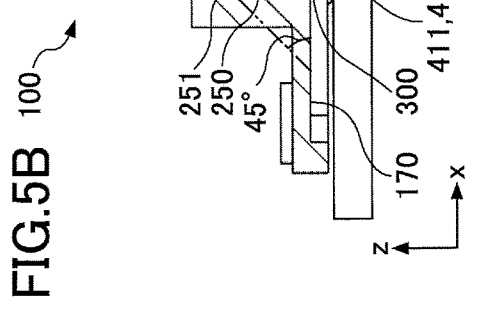
FIGS. 5A through 5C are illustrative drawings of the optical module of the first embodiment.
Figure 5B:
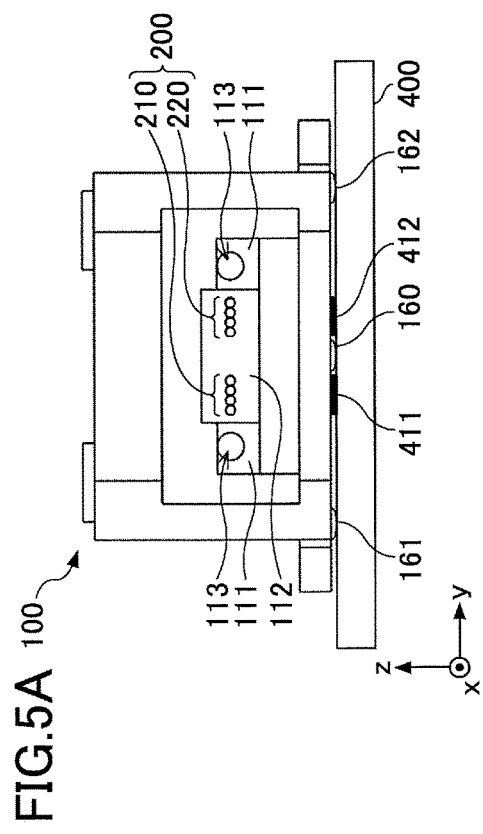
Figure 5C:
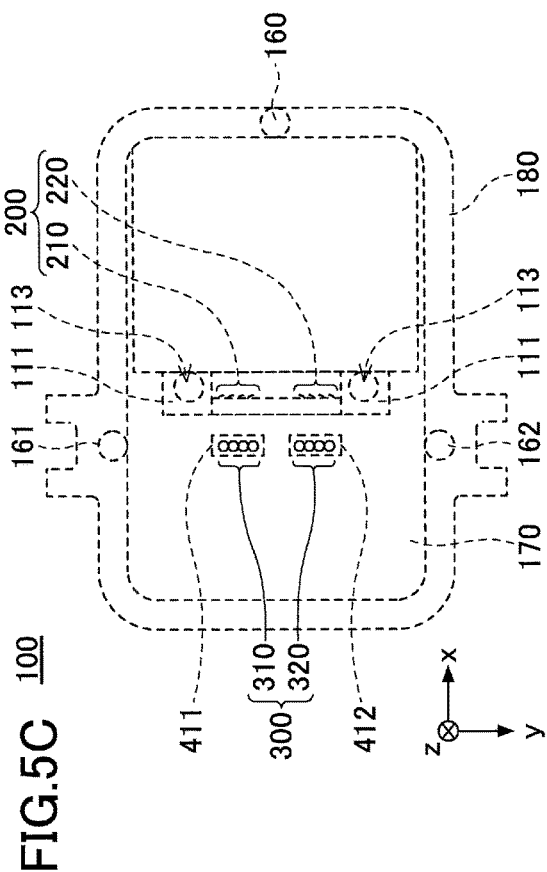

The optical module 100 is mounted on the board 400 such that the lenses 310 are situated directly above the optical detectors 411, and such that the lenses 320 are situated directly above the light emitting devices 412. FIGS. 5A through 5C illustrate the optical module 100 aligned with and mounted on the board 400. FIG. 5A is a drawing illustrating the optical module 100 as viewed from the insertion-hole side. FIG. 5B is a lateral cross-sectional view of the optical module 100. FIG. 5C is a view of the bottom face of the optical module 100. The optical module 100 as illustrated in FIGS. 5A through 5C is connected to the MT ferule 140 to form an optical transceiver.

As illustrated in FIG. 5C, the positions of the light emitting devices 412 coincide with the positions of the lenses 320, and, also, the positions of the optical detectors 411 coincide with the positions of the lenses 310 as viewed from the bottom-face side. In such a manner, the optical module 100 is aligned with the board 400 in the x-axis direction and in the y-axis direction.

The legs 160 through 162 have a certain height such that the light emitting devices 412 and the optical detectors 411 are accommodated in the gap between the bottom face 170 of the optical module 100 and the board 400.

[Light Loss]

In the following, light loss in the optical module of the present embodiment will be described. In the following, comparison is made between the optical module having the core 250 according to the present embodiment and an optical module 900 having only a sloped face without a core.

Figure 6A:
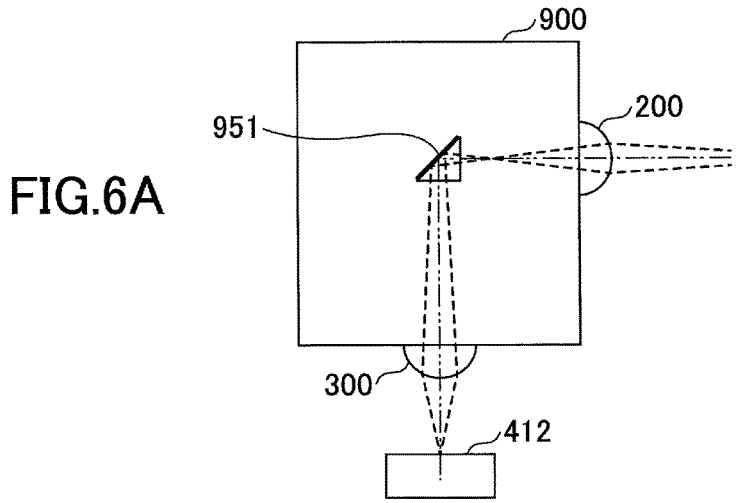
FIGS. 6A through 6C are illustrative drawings of light loss in the optical module.
Figure 6B:
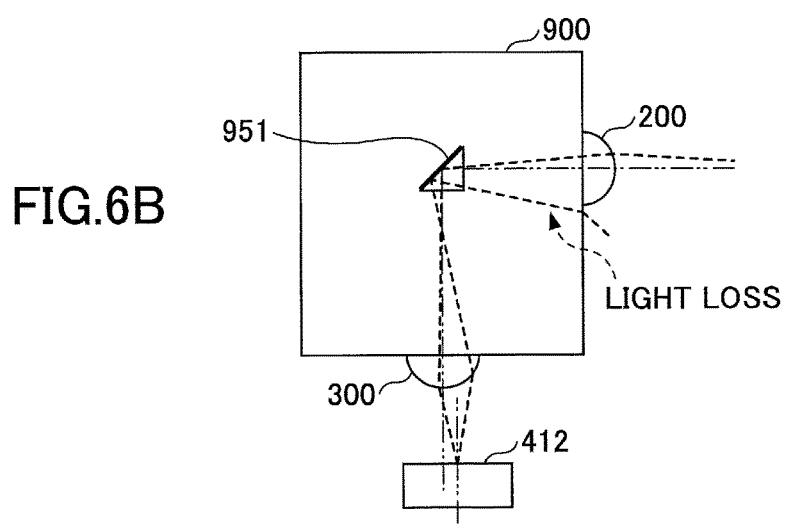
Figure 6C:
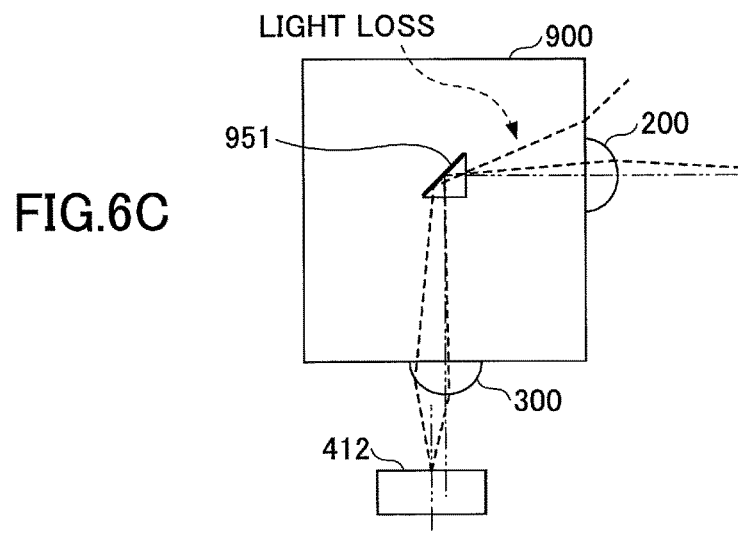

FIGS. 6A through 6C illustrate the optical module 900 lacking a core. In the drawings, dashed lines represent light paths. Further, two-dot chain lines represent an axis of the light emitted from a light emitting device 412 as well as the axis of the first lens group 200 and the axis of the second lens group 300.

FIG. 6A illustrates the optical module 900 that is positioned with respect to the light emitting device 412 such that the axis of the light emitted from the light emitting device 412 coincides with the center of the lens of the second lens group 300. In the arrangement illustrated in FIG. 6A, the light emitted from the light emitting device 412 enters the optical module 900 through the lens of the second lens group 300, and is then reflected by a sloped face 951, followed by exiting through the lens of the first lens group 200. In FIG. 6A, the axis of the light emitted from the light emitting device 412 coincides with the center of the lens of the second lens group 300, and also coincides with the center of the lens of the first lens group 200. With this arrangement, there is substantially no light loss with respect to the light exiting through the lens of the first lens group 200.

FIG. 6B illustrates the optical module 900 that is displaced to the left in the drawing relative to the light emitting device 412. In FIG. 6B, the axis of the light emitted from the light emitting device 412 is off the center of the lens of the second lens group 300. In this case, part of the light reflected by the sloped face 951 reaches a point below the first lens group 200 as illustrated in FIG. 6B, thereby failing to enter the first lens group 200. This deviating light causes light loss.

In FIG. 6C, the optical module 900 is displaced to the right in the drawing relative to the light emitting device 412. In this case also, the axis of the light emitted from the light emitting device 412 is off the center of the lens of the second lens group 300. Part of the light emitted from the light emitting device 412 and reflected by the sloped face 951 reaches a point above the first lens group 200 as illustrated in FIG. 6C, thereby failing to enter the first lens group 200. This deviating light causes light loss.

Figure 7A:
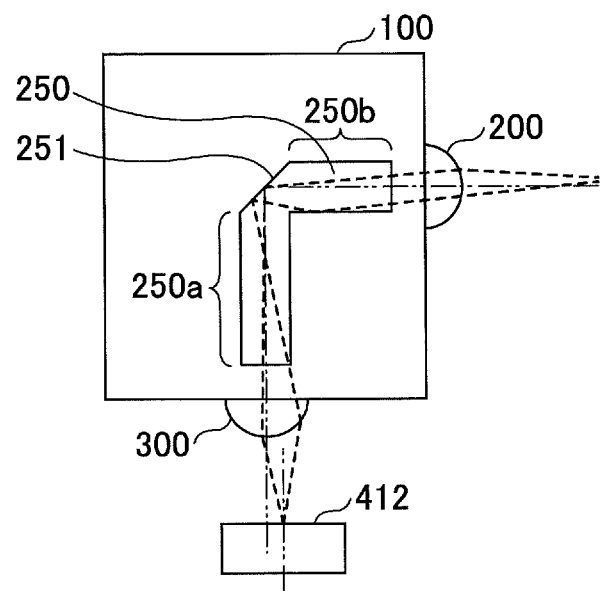
FIGS. 7A and 7B are illustrative drawings of light loss in the optical module.
Figure 7B:
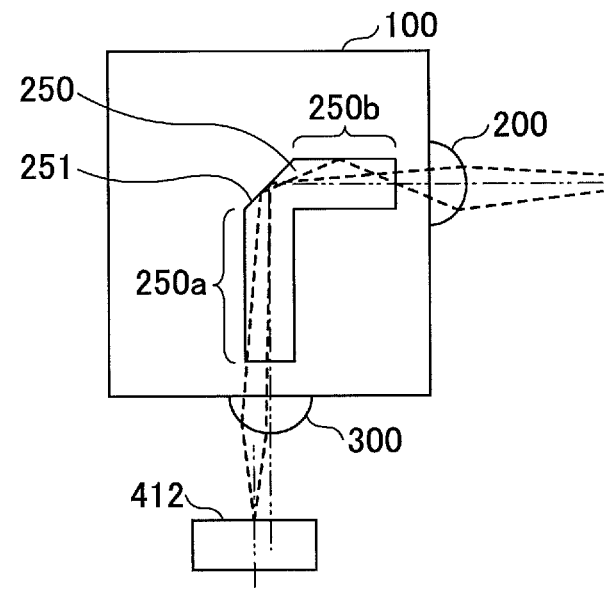

On the other hand, the optical module 100 of the present embodiment causes substantially no light loss even when the optical module 100 is displaced relative to the light emitting device 412 as illustrated in FIGS. 7A and 7B. It may be noted that neither explanation nor illustration is given for the case in which the lens center of the lens group coincides with the axis of the light emitted from the light emitting device. In such a case, light loss is substantially low.

In FIG. 7A, the optical module 100 is displaced to the left in the drawing relative to the light emitting device 412. In this case, the axis of the light emitted from the light emitting device 412 is off the center of the lens of the second lens group 300. Despite this arrangement, the light emitted from the light emitting device 412 propagates inside the core 250, which suppresses deviated light that would travel toward a point below the first lens group 200 as illustrated in FIG. 6B. There is thus substantially no occurrence of light loss. Namely, the light emitted from the light emitting device 412 enters the core 250 through the lens of the second lens group 300, and is then reflected by the sloped face 251 to propagate further inside the core 250, followed by exiting through the lens of the first lens group 200. In so doing, light propagates inside the core 250 by undergoing total reflection at the outer interface of the core 250, so that almost all of the light that enters the core 250 enters the lens of the first lens group 200, thereby resulting in almost no light loss.

In FIG. 7B, the optical module 100 is displaced to the right in the drawing relative to the light emitting device 412. In this case also, the light emitted from the light emitting device 412 propagates inside the core 250, thereby resulting in substantially no light loss as in the case of FIG. 7A. Namely, the light entering the core 250 through the second lens group 300 is reflected by the sloped face 251 to propagate further inside the core 250, followed by exiting through the first lens group 200. In so doing, light propagates inside the core 250 by undergoing total reflection at the outer interface of the core 250, so that almost all of the light having entered the core 250 enters the lens of the first lens group 200.

Figure 8A:
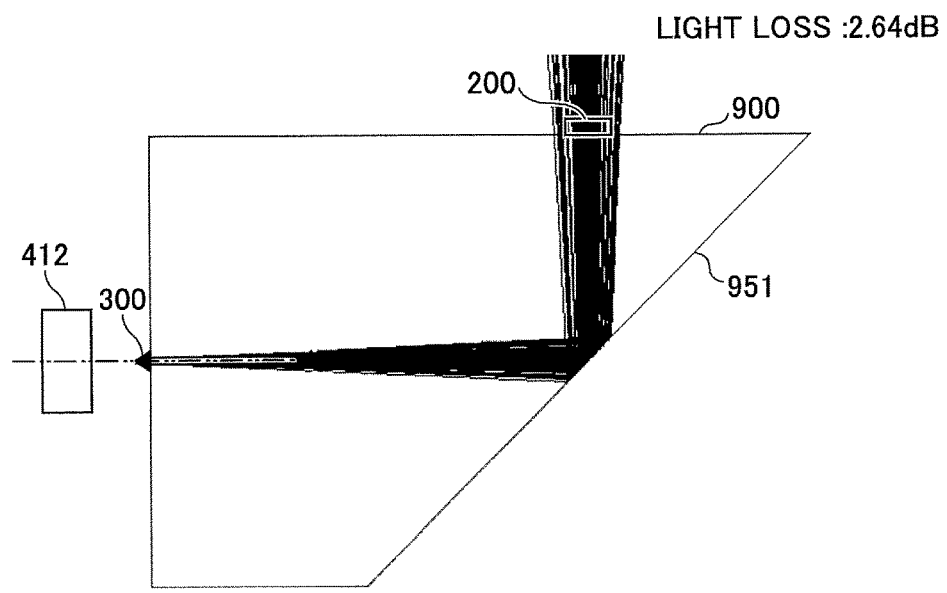
FIGS. 8A and 8B are illustrative drawings of light loss in the optical module.
Figure 8B:
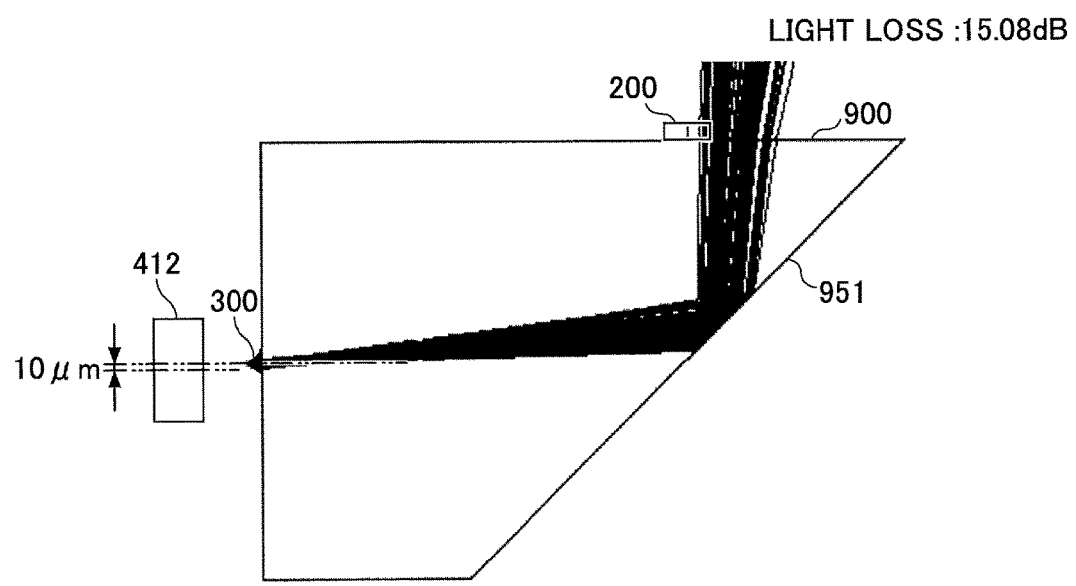

What was described above will be elaborated by showing simulation results. In this simulation, a lens of the first lens group 200 had a diameter of 250 micrometers. FIGS. 8A and 8B are drawings illustrating the results of simulation performed with respect to the optical module 900 having the sloped face 951 of 45 degrees with no core as illustrated in FIGS. 6A through 6C.

When the optical module 900 is mounted at its intended position relative to the light emitting device 412 as illustrated in FIG. 8A, the axis of the light emitted from the light emitting device 412 coincides with the center of the lens of the second lens group 300. With this arrangement, a substantial portion of the light having propagated inside the optical module 900 and having been reflected by the sloped face 951 enters the lens of the first lens group 200. It is difficult for the second lens group 300 to convert the light emitted from the light emitting device 412 into perfect parallel light rays, resulting in the incident light spreading in the optical module 900 while propagating therein. The finite size of the lens of the first lens group 200 means that some of the spreading light propagating in the optical module 900 does not enter the lens of the first lens group 200. Such a light component accounts for light loss. According to the results of simulation, light loss in this case was 64 dB. It may be noted that this value of light loss represents loss in the ideal arrangement in which the axis of the light emitted from the light emitting device 412 coincides with the center of the lens of the second lens group 300 and the center of the lens of the first lens group 200. In other words, this value represents the lowest possible light loss observed in the optical module 900 illustrated in FIGS. 8A and 8B.

When the optical module 900 is displaced by 10 micrometers relative to the light emitting device 412 as illustrated in FIG. 8B, the axis of the light emitted from the light emitting device 412 is at 10 micrometers off the center of the lens of the second lens group 300. With this arrangement, a substantial portion of the light having propagated inside the optical module 900 and having been reflected by the sloped face 951 does not enter the lens of the first lens group 200. This portion accounts for light loss. According to the results of simulation, light loss in this case was 15.08 dB.

Figure 9A:
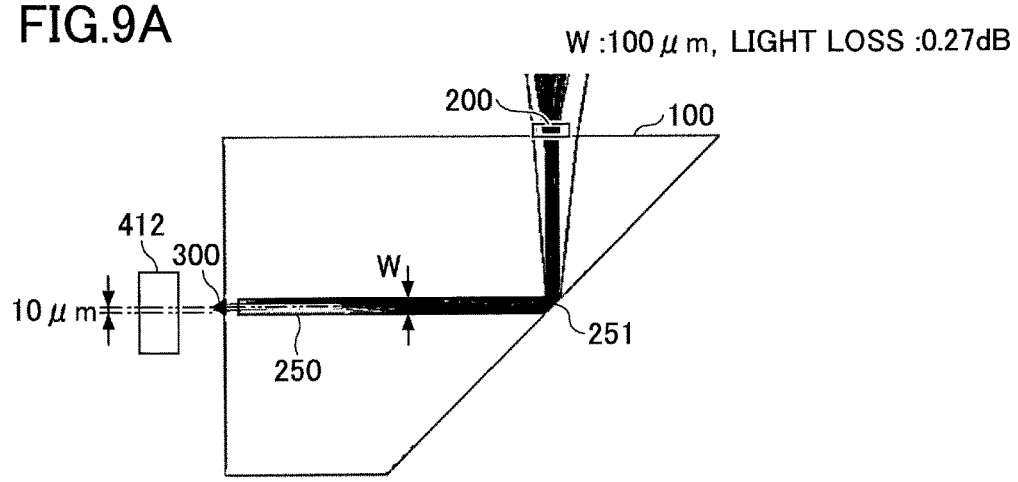
FIGS. 9A through 9C are illustrative drawings of light loss in the optical module.
Figure 9B:
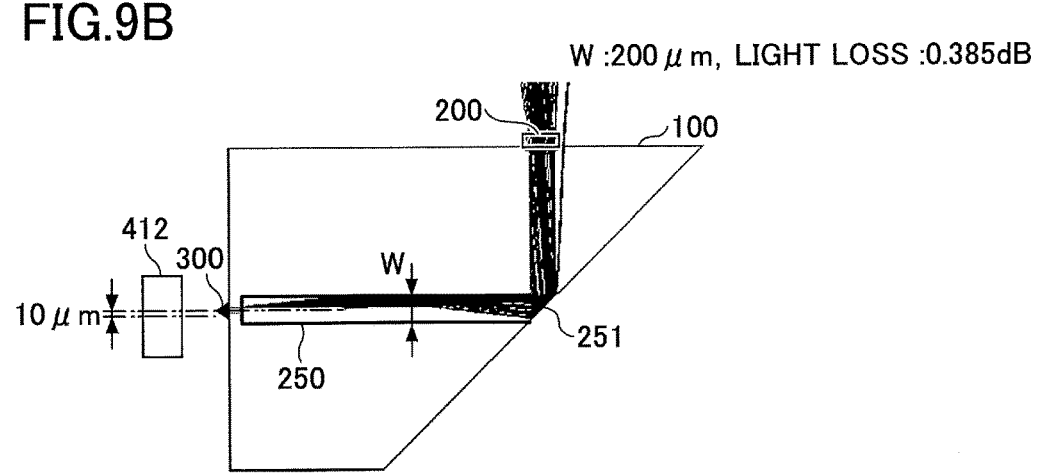
Figure 9C:
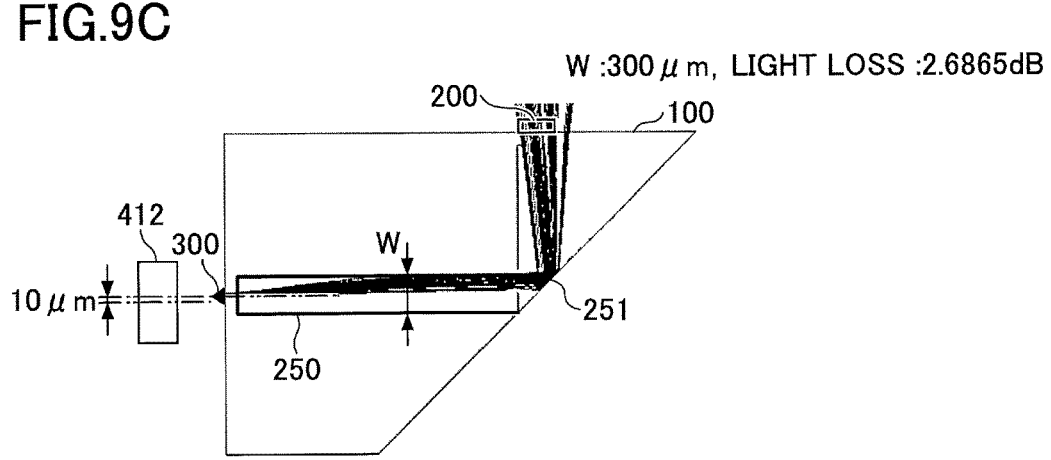

FIGS. 9A through 9C illustrate the results of simulation performed with respect to the optical module 100 having the core 250 as illustrated in FIGS. 7A and 7B. FIGS. 9A through 9C illustrate the case in which the optical module 100 is displaced by 10 micrometers relative to the light emitting device 412.

FIG. 9A illustrate the case in which the width W of the core 250 is 100 micrometers. With the 100-micrometer core width W as illustrated in FIG. 9A, a significant portion of the light emitted from the light emitting device 412 and reflected by the sloped face 251 enters the lens of the first lens group 200 because the light emitted from the light emitting device 412 propagates inside the core 250 by undergoing total reflection, despite the fact that the axis of the light emitted from the light emitting device 412 is at 10 micrometers off the center of the lens of the second lens group 300. According to the results of simulation, light loss in this case was 0.27 dB.

The width W of the core 250 is 200 micrometers in FIG. 9B. Light loss according to the results of simulation was 0.385 in this case.

The width W of the core 250 is 300 micrometers in FIG. 9C. Light loss according to the results of simulation was 2.6865 in this case.

As is described above, the provision of the core 250 realizes the reduction of light loss in the optical module 100. It may be noted that increasing the core width W of the core 250 in excess of the lens diameter of the first lens group 200 will increase the amount of light failing to enter the first lens group 200. In consideration of this, the core width W is preferably smaller than the lens diameter of the first lens group 200.

[Production Method]

Figure 10A:
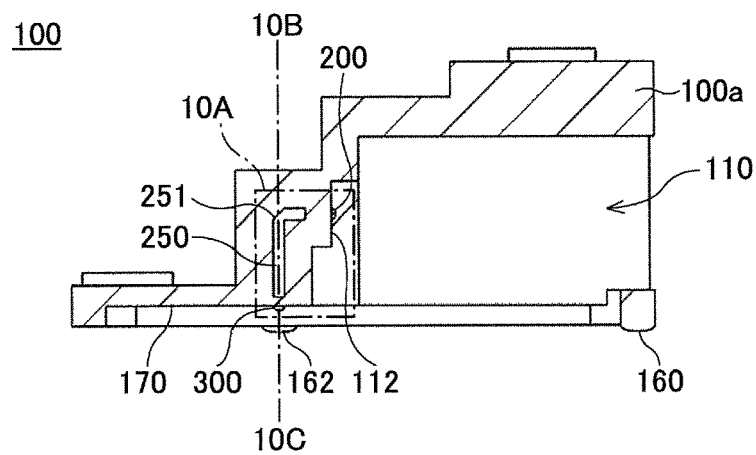
FIGS. 10A through 10C are illustrative drawings of the optical module of the first embodiment.
Figure 10B:
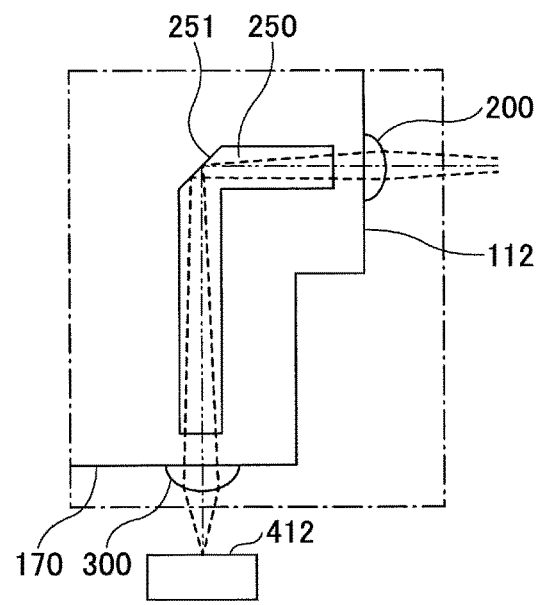
Figure 10C:
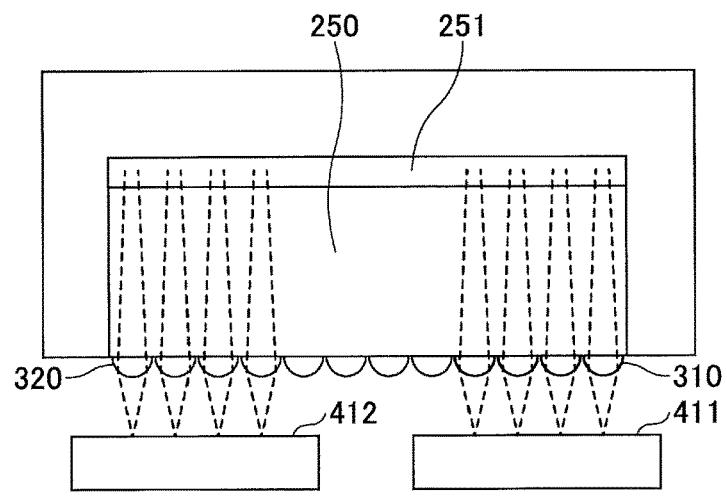

A description will be given of the method of making the optical module 100. FIG. 10A is a cross-sectional view illustrating the optical module. FIG. 10B is an enlarged view of the portion enclosed by the chain line 10A shown in FIG. 10A. FIG. 10C is a cross-sectional view taken along the chain line 10B-10C shown in FIG. 10A. In FIGS. 10B and 10C, dashed lines represent light paths, and two-dot chain lines represent an axis.

Firstly, an optical module member having an inner space in which the core 250 is to be formed is formed. An optical module member having an inner space, the legs 160 through 162, the second lens group 300, and the first lens group 200 is formed by injection molding as a unitary, seamless structure of transparent resin. This inner space has a sloped face.

Subsequently, the inner space is filled with liquid resin, which is then cured to form the core 250. The resin for the core 250 may be thermosetting resin or photo-curable resin. In the case of thermosetting resin, the inner space of the optical module is filled with thermosetting resin, which is then heated and thermally cured to form the core 250. In the case of a photo-curable resin, the inner space is filled with photo-curable resin, which is then illuminated by light, such as ultraviolet light, and cured to form the core 250. In the present embodiment, the refractive index of the resin of the core 250 is higher than the refractive index of the material of the optical module member that surrounds the core 250.

Figure 11A:
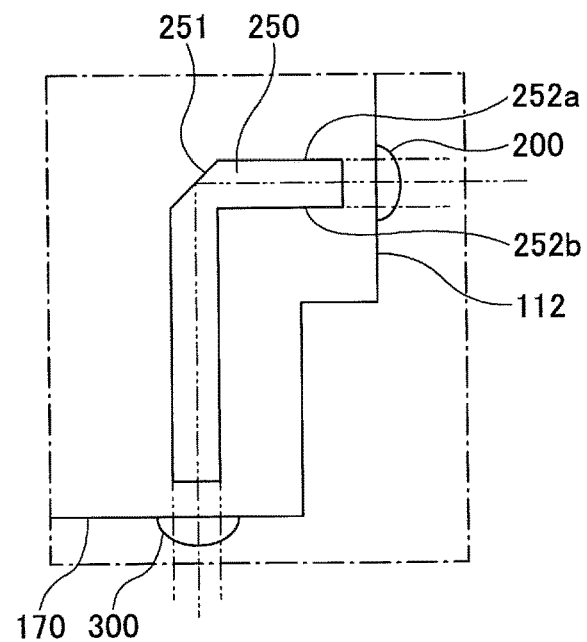
FIGS. 11A and 11B are illustrative drawings of the optical module of the first embodiment.
Figure 11B:
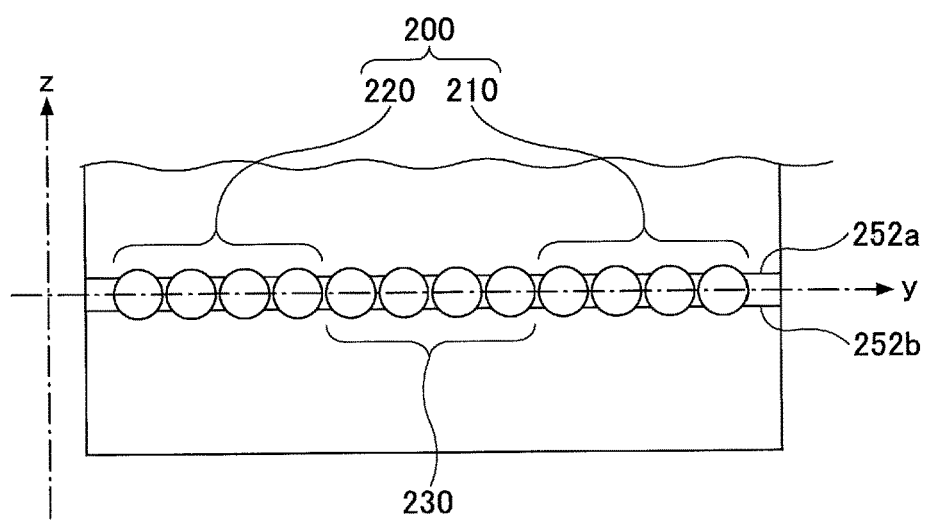

The optical module 100 allows the positions of the lenses of the first lens group 200 and the positions of the lenses of the second lens group 300 to be accurately measured. Specifically, the positions of upper and lower edges 252a and 252b of the core 250 are first identified. Then, the positions in the z-axis direction of the centers of the lenses 210, the lenses 220, and dummy lenses 230 are identified with respect to a reference line that is the midline between the core edges 252a and 252b extending in the y-axis direction. This arrangement allows a check to be made as to whether the first lens group 200 is formed at its intended position in the z-axis direction. The z coordinate, relative to the reference point, of the center of a given lens of the first lens group 200 is a distance in the z-axis direction between the center of the core 250 and the center of the given lens. If z is equal to zero, the center of the core 250 coincides with the center of the lens without any displacement. FIG. 11A illustrates an enlarged view of the portion where the core 250 is formed, and FIG. 11B illustrates an enlarged view of the optical module 100 as viewed from the insertion-hole side. In FIG. 11A, two-dot chain lines represent an axis and imaginary extension of the faces of the core 250. FIG. 11B illustrates the structure that has the dummy lenses 230 situated between the lenses 210 and the lenses 220. The dummy lenses 230 are used to identify the center of the first lens group 200 in such an area that is situated between the lenses 210 and the lenses 220.

The above description is directed to an example in which the positions of the lenses of the first lens group 200 are checked after the core 250 is formed in the optical module 100. The positions of the lenses may similarly be checked before forming the core 250 into the optical module member. In this case, the positions in the z-axis direction of the center of the lenses of the first lens group 200 are identified relative to a reference line that is the midline between the edges of the space that is to be filled with the core 250.

In the embodiment described above, the lenses 210 and 320 and the lenses 220 and 310 are aspherical lenses. Alternatively, other types of lenses such as spherical lenses which are easy to manufacture may be used to allow the optical module to be produced at lower cost.

Second Embodiment

Figure 12A:
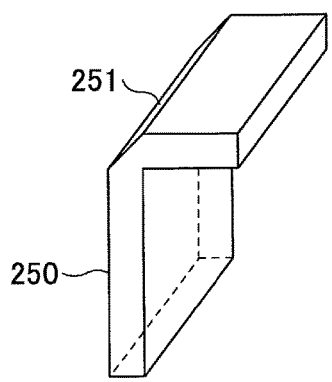
FIGS. 12A and 12B are illustrative drawings of the optical module of a second embodiment.
Figure 12B:
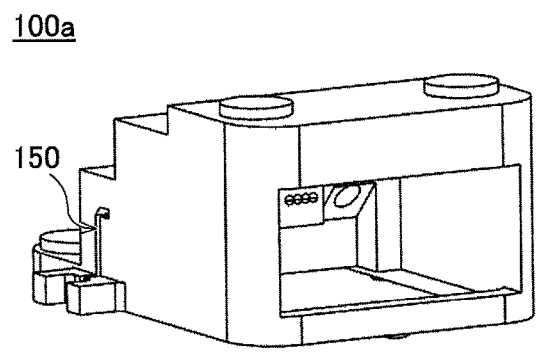

A second embodiment will be described. In the second embodiment, the core 250 having a shape coinciding with a space 150 of an optical module 100a is produced in advance by use of transparent resin as illustrated in FIG. 12A, and then inserted into the space 150 of the optical module 100a as illustrated in FIG. 12B. In the second embodiment, the refractive index of the core 250 is higher than the refractive index of the optical module 100a.

Third Embodiment

A third embodiment will be described.

Figure 13A:
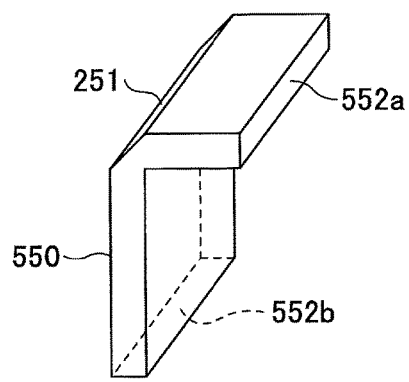
FIGS. 13A through 13C are illustrative drawings of the optical module of a third embodiment.
Figure 13C:
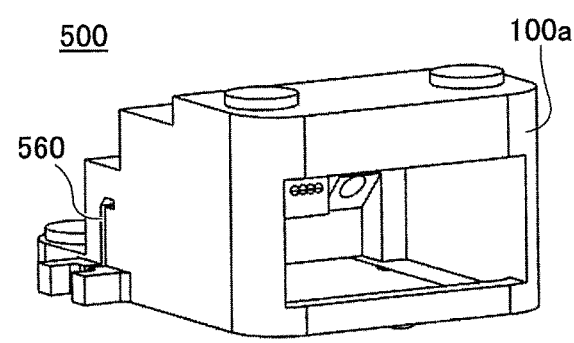
Figure 13B:
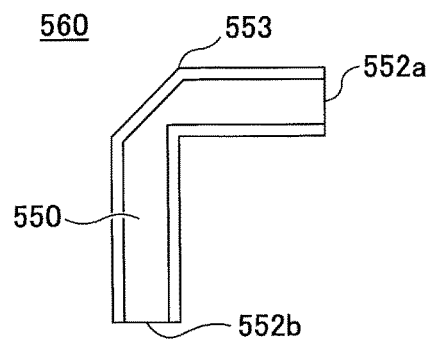

For an optical module of the third embodiment, a core 550 illustrated in FIG. 13A has the faces thereof coated with coating films 553 as illustrated in FIG. 13B, which are made by applying resin to the faces except for the reception face 552a and the transmission face 552b. The core part 560 having the coating films 553 formed thereon is inserted and secured into the space 150 of the optical module 100a as illustrated in FIG. 13C. The coating films 553 are made of resin having a lower refractive index than the resin constituting the core 550. Further, the resin of the core 550 may have a refractive index higher than, or lower than, the resin constituting the optical module 100a.

Fourth Embodiment

Figure 14A:
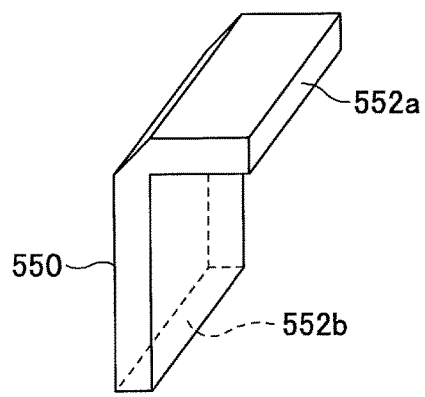
FIGS. 14A through 14C are illustrative drawings of the optical module of a fourth embodiment.
Figure 14C:
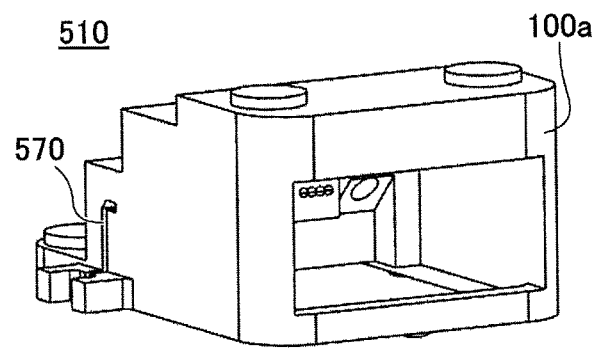
Figure 14B:
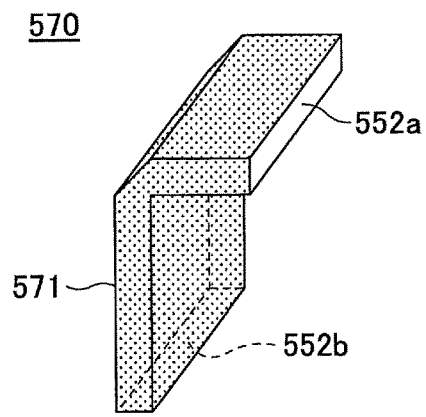

A fourth embodiment will be described. In the fourth embodiment, a core 550 is produced as illustrated in FIG. 14A, followed by forming a metal film 571 of light-reflective metal material on the faces of the core 550 as illustrated in FIG. 14B through vapor deposition or the like except for the reception face 552a and the transmission face 552b. The core part 570 having the metal film 571 formed thereon is inserted into the space 150 of the optical module 100a as illustrated in FIG. 14C.

In the fourth embodiment, light entering the core 550 propagates inside the core 550 by undergoing reflection on the inner faces of the metal film 571 formed on the core 550. Further, the resin material of the core 550 may have a refractive index higher than, or lower than, the resin constituting the optical module 100a.

Fifth Embodiment

Figure 15:
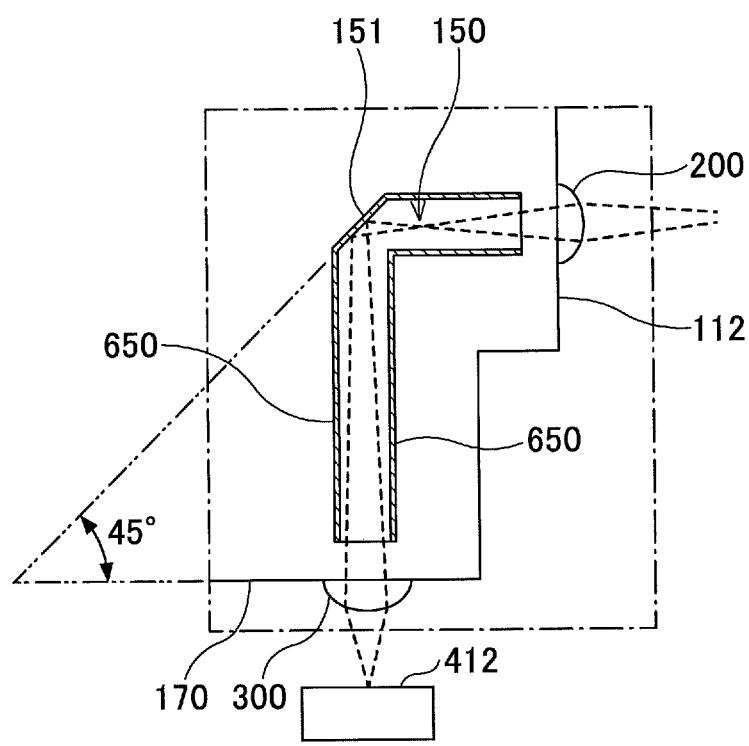
FIG. 15 is an illustrative drawing of the optical module of a fifth embodiment.

A fifth embodiment will be described. FIG. 15 is an enlarged view of the cross-section of an optical module according to the fifth embodiment. Dashed lines represent light paths.

The optical module of the fifth embodiment has metal films 650 formed on the inner walls of the space 150 as illustrated in FIG. 15. The space 150 has a sloped face 151 for reflecting light. The optical module according to the present embodiment has no resin core disposed in the space 150. The metal films 650 of light-reflective material are formed by vapor deposition or sputtering on the inner walls of the space 150 except for the light reception and transmission faces. During vapor deposition or sputtering, vapor particles or the like easily enter the space 150 and reach every corner of the space 150, and the metal films 650 are formed on all the walls of the space 150.

In the fifth embodiment, light entering the space 150 propagates inside the space 150 by undergoing reflection on the metal films 650. Despite the absence of a core in the space 150, thus, the present embodiment enables the reduction of light loss similarly to the configuration having such a core.

Films coating the inner walls of the space may be made of non-metal material, as long as such films can efficiently reflect light.

Sixth Embodiment

Figure 16A:
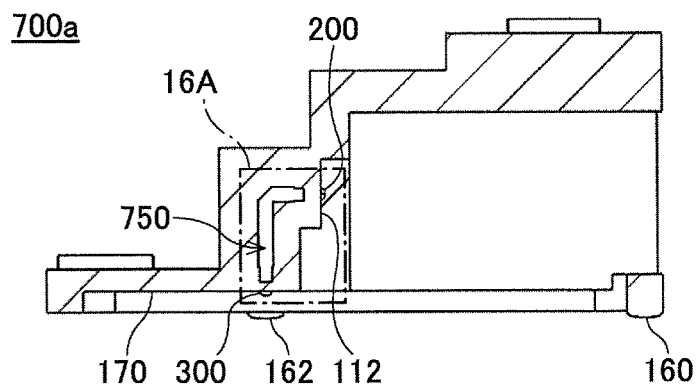
FIGS. 16A through 16C are illustrative drawings of the optical module of a sixth embodiment.
Figure 16B:
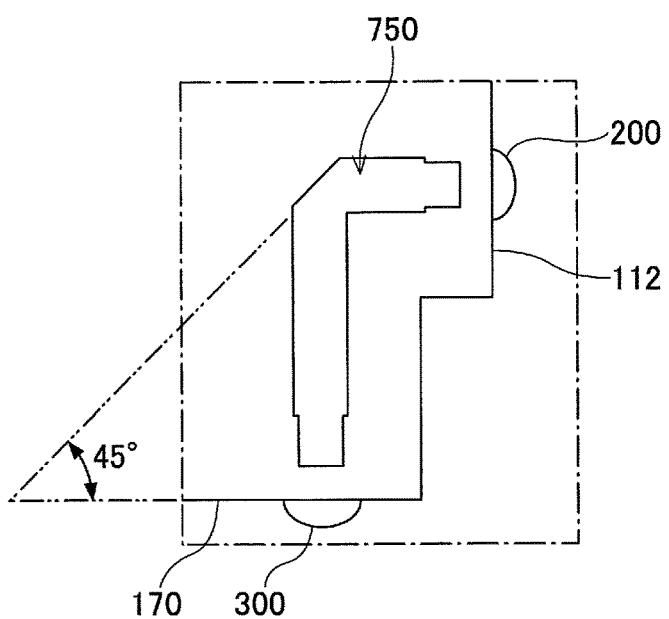
Figure 16C:
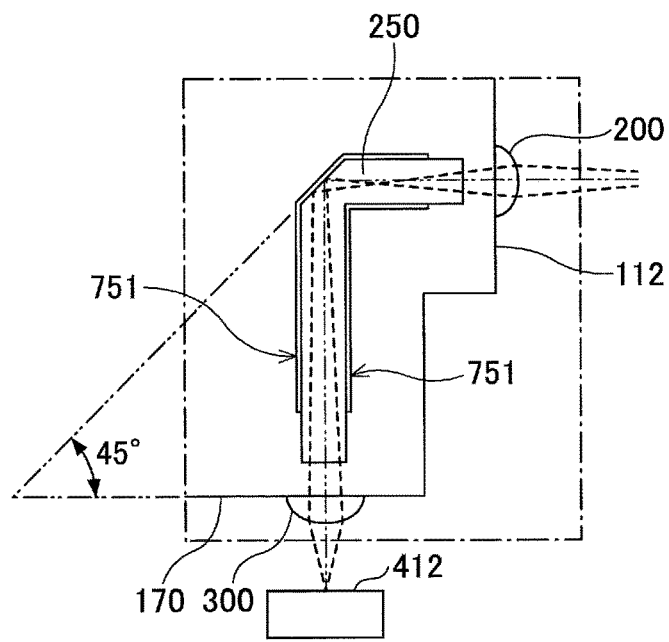

A sixth embodiment will be described. FIG. 16A is a cross-sectional view of an optical module member 700a. FIG. 16B is an enlarged view of the portion enclosed by the chain line 16A shown in FIG. 16A. FIG. 16C is an enlarged view of the cross-section of the optical module.

The optical module of the sixth embodiment has gaps 751 formed between the optical module member 700a and the core 250 as illustrated in FIG. 16C. This arrangement reduces a critical angle necessary to provide total reflection at the interface of the core 250, thereby further reducing light loss. The optical module member 700a has an inner space 750 that is slightly wider in the vertical direction than the width of the portion of the core 250 situated toward the first lens group 200, and that is also slightly wider in the horizontal direction than the width of the portion of the core 250 situated toward the second lens group 300. The core 250 similar to the core of the second embodiment is inserted into the space 750. This arrangement creates the gaps 751 between the optical module member 700a and the core 250 as illustrated in FIG. 16C.

Seventh Embodiment

Figure 17:
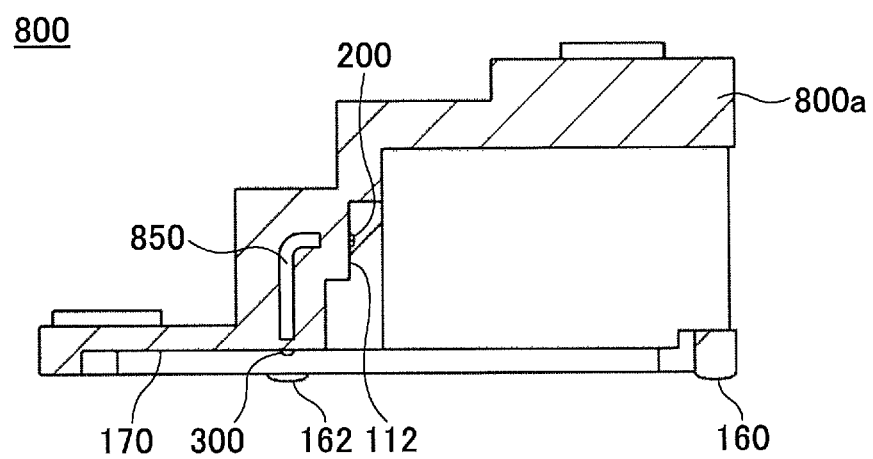
FIG. 17 is an illustrative drawing of the optical module of a seventh embodiment.

A seventh embodiment will be described. FIG. 17 is a cross-sectional view of an optical module 800 according to the present embodiment. The optical module 800 of the seventh embodiment has a core 850 which does not have a sloped face. Specifically, the core 850, which is made of a material having a higher refractive index than a surrounding optical module member 800a, has a gentle curve halfway through. Light entering the core 850 propagates in the core 850 by undergoing total reflection at the interface of the core 850, which provides lower light loss than in the case of light being reflected at a sloped face. The optical module of the present embodiment is made by a method similar to the method used in the first embodiment.

Further, although the present invention is not limited to these embodiments, but various variations and modifications may be made without departing from the scope of the present invention.

The present application is based on and claims the benefit of priority of Japanese priority application No. 2015-112611 filed on Jun. 2, 2015, with the Japanese Patent Office, the entire contents of which are hereby incorporated by reference.

What is claimed is:

1. An optical module for connecting a photoelectric conversion device on a substrate to a ferrule connected to an optical fiber, the optical module comprising:
   a body configured to be mounted on the substrate;
   a first lens disposed on the body at a side thereof connectable to the ferrule;
   a second lens disposed on the body at a side thereof facing the substrate; and a core disposed in the body between the first lens and the second lens, wherein the core has faces on which a coating film is formed, and a refractive index of the coating film is lower than a refractive index of the core, and wherein the body, the first lens, and the second lens are formed as a unitary, seamless structure, and the body has a space formed therein that is exposed through an opening on a lateral face thereof, the core being placed in the space inside the body through the opening on the lateral face.

2. The optical module as claimed in claim 1, wherein the core has a sloped face configured to reflect light entering the core through one of the first lens and the second lens.

3. The optical module as claimed in claim 1, comprising a plurality of said first lenses and a plurality of said second lenses, wherein the core is disposed in the body between the plurality of first lenses and the plurality of second lenses, the core including a first rectangular plate and a second rectangular plate perpendicular to and seamlessly connected with the first rectangular plate, the first rectangular plate facing the plurality of first lenses, and the second rectangular plate facing the plurality of second lenses.

* * * * *